Figure 4:
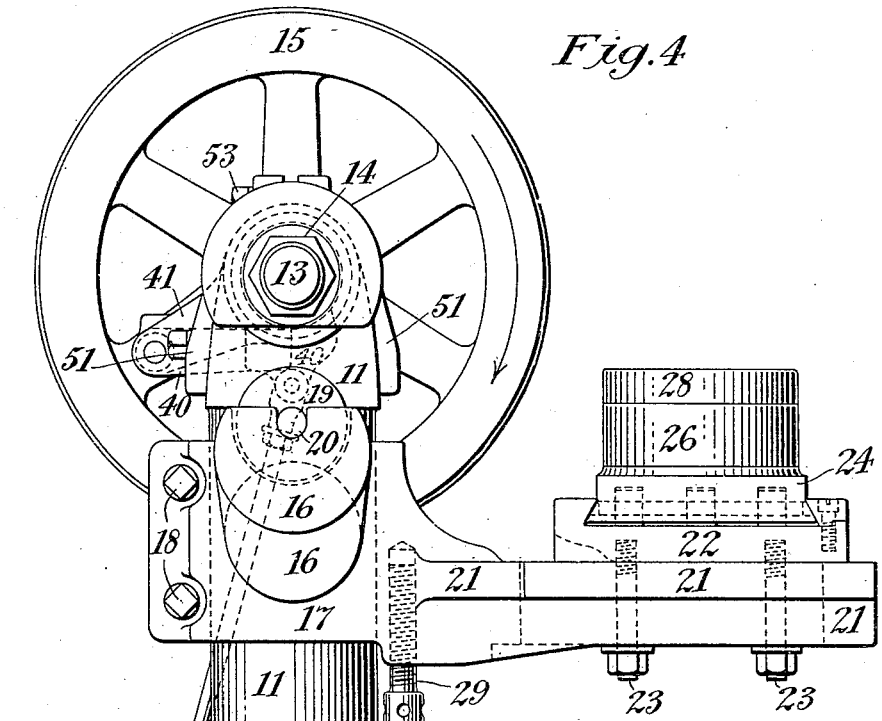

J. B. CONOVER.
CAN MARKING MACHINE.
APPLICATION FILED SEPT. 23, 1907.
943,140.
Patented Dec. 14, 1909.
5 SHEETS—SHEET 1.
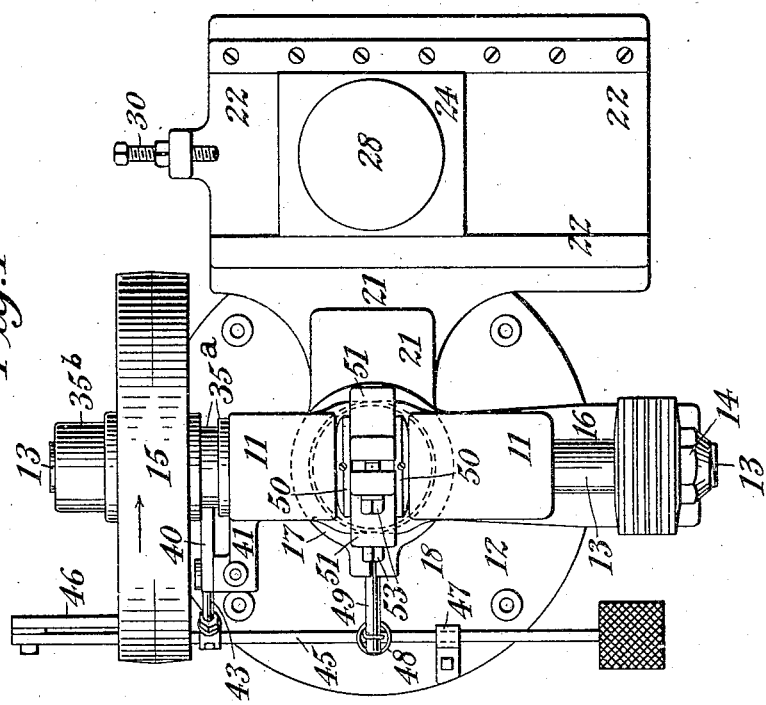
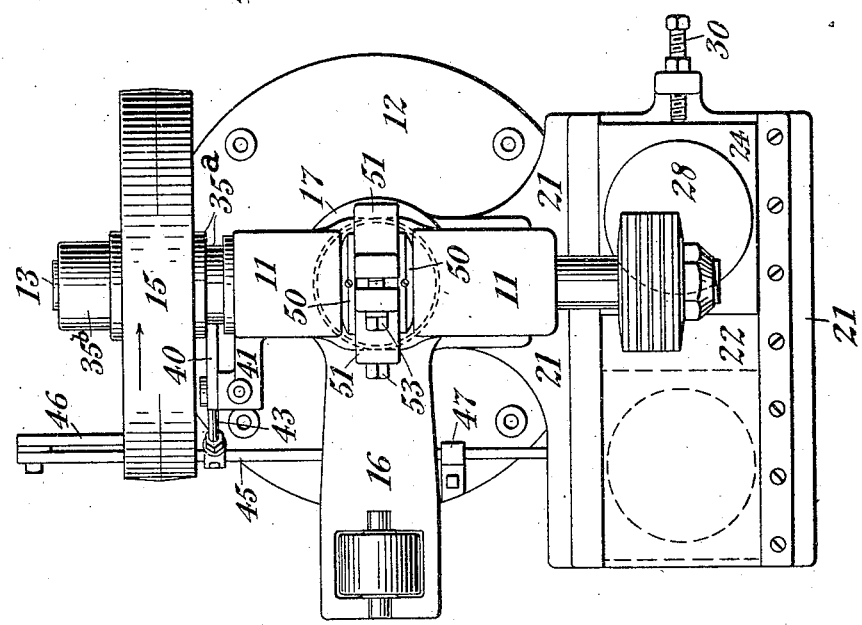
Witnesses:
Inventor:
Jacob B. Conover
by Henry D. Williams
Attorney.

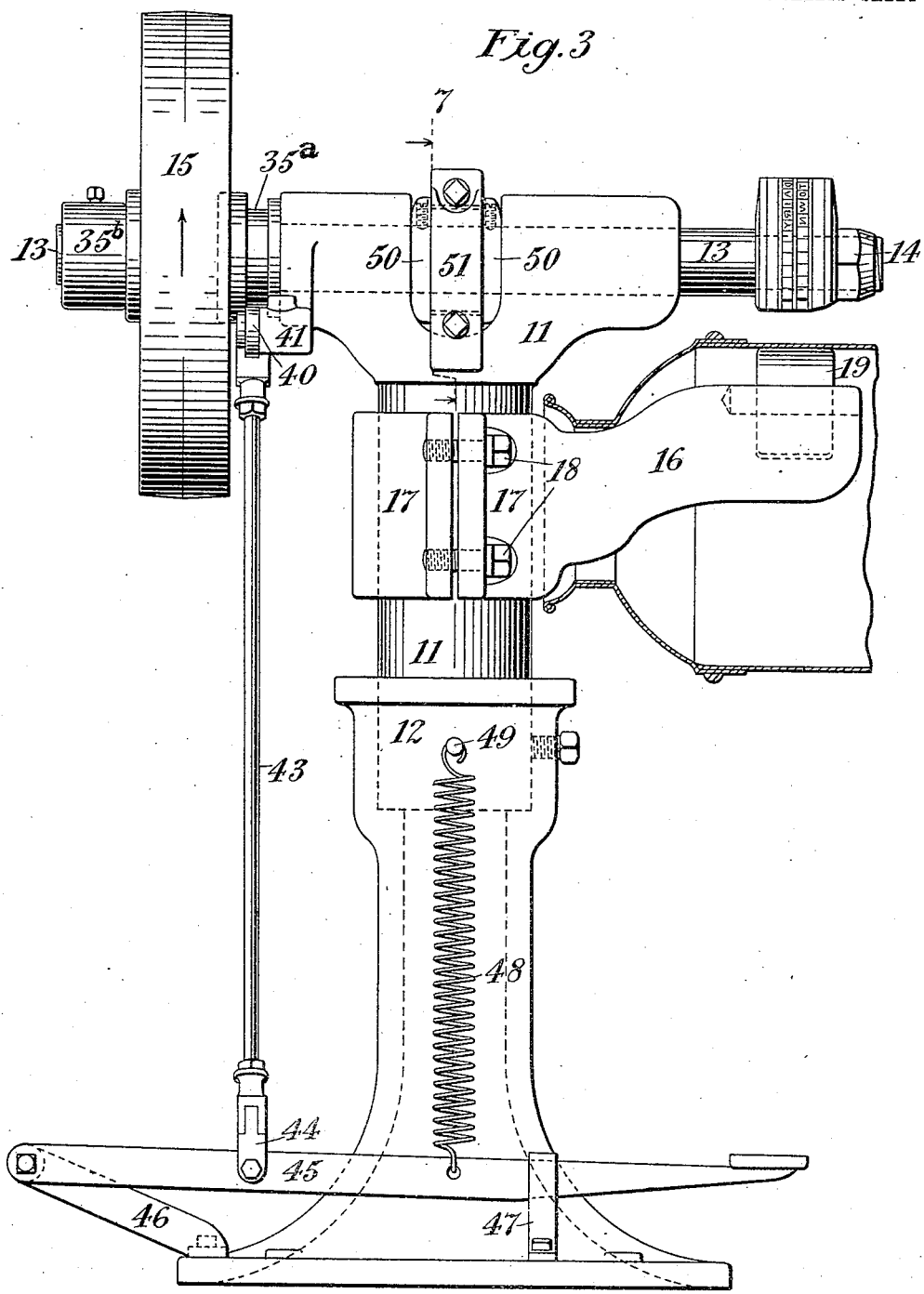

J. B. CONOVER.
CAN MARKING MACHINE.
APPLICATION FILED SEPT. 23, 1907.

943,140.

Patented Dec. 14, 1909.
5 SHEETS—SHEET 3.

Witnesses:
Wm. Ashley Kelly
Bernard Cowen

Inventor:
Jacob B. Conover
by Henry D. Williams
Attorney.

J. B. CONOVER.
CAN MARKING MACHINE.
APPLICATION FILED SEPT. 23, 1907.
943,140.
Patented Dec. 14, 1909.
5 SHEETS—SHEET 4.
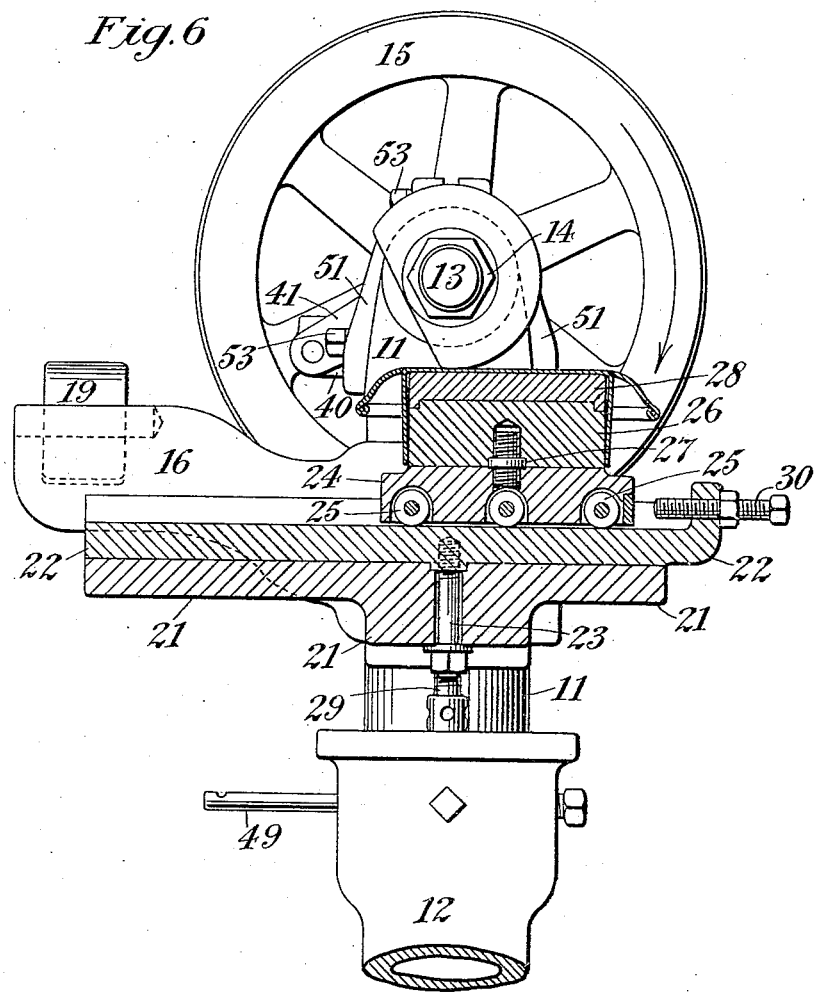
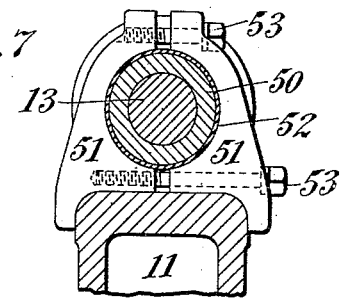
Witnesses:
Wm. Ashley Kelly
Bernard Cowen
Inventor:
Jacob B. Conover
by Henry D. Williams
Attorney.

J. B. CONOVER.
CAN MARKING MACHINE.
APPLICATION FILED SEPT. 23, 1907.

943,140.

Patented Dec. 14, 1909.
5 SHEETS—SHEET 5.

Witnesses:
Wm. Ashley Kelly
Bernard Cowen

Inventor:
Jacob B. Conover
by Henry D. Williams
Attorney.

UNITED STATES PATENT OFFICE.

JACOB B. CONOVER, OF JERSEY CITY, NEW JERSEY, ASSIGNOR TO DAIRYMEN'S MANUFACTURING COMPANY, A CORPORATION OF NEW YORK.

CAN-MARKING MACHINE.

943,140.  Specification of Letters Patent.  Patented Dec. 14, 1909.

Application filed September 23, 1907. Serial No. 394,154.

*To all whom it may concern:*

Be it known that I, JACOB B. CONOVER, a citizen of the United States, residing at Jersey City, in the county of Hudson and State of New Jersey, have invented a certain new and useful Improvement in Can-Marking Machines, of which the following is a specification, reference being had therein to the accompanying drawings, forming part thereof.

My invention relates to can marking machines, and my invention has for its object to quickly, inexpensively and effectively mark both the cylinders or bodies and the covers or tops of milk cans, ice cream cans and the like.

My invention includes rotating means for successively impressing characters into the material of the can from the outside of the can while leaving the inner surface of the can substantially smooth.

My invention also includes means for marking both the cylinders and the covers of the cans.

My invention also includes various improvements in the construction and combination of parts.

It is not only desirable but necessary to the proper transaction of business that milk cans shall be marked for identification, as, for example, by marks indicating the name and location of the dairy to which they belong.

It is well known that one of the requirements in milk cans and articles for similar purposes is that the interiors thereof shall be kept smooth, so as to permit thorough cleansing and afford no lodgment for unsanitary particles and germs. For this reason markings or letterings should not be indented through the material of the cans so as to be embossed or form a bas-relief on the interior of the cans. Various expedients in the marking of milk cans have been resorted to. Sometimes the marks are painted or stenciled on the cans, but such markings quickly become indistinct and eventually become effaced from wear in handling the cans, necessitating re-marking at short intervals of time. Another manner of marking has been to solder to the outside of the cans stamped or otherwise prepared plates containing the inscriptions, but this is expensive and otherwise obviously disadvantageous. Probably the most satisfactory marking heretofore practiced has been by indenting or imprinting the marks into the metal of the cans from the outside, leaving the metal smooth on the insides of the cans, a hammer, suitable anvil and marking-punches or dies being used; but as in this way only a single character or letter can be imprinted at a time the work is slow, tedious and expensive. It has been found impracticable to stamp or imprint the entire inscription at once or simultaneously upon the can, by any means heretofore used.

In order to overcome the above enumerated difficulties I have produced the present invention and have devised a machine which imprints or indents the marking or inscription with substantially the same result as when done one character at a time with hammer and punch, but by the use of which the entire or complete mark or inscription is applied even more quickly than a single letter or character could be applied by hand as described above.

Other objects and advantages of my invention will be apparent from the following description.

The embodiment of my invention shown will now be described with reference to the accompanying drawings, after which I will point out my invention in claims.

Figure 5:
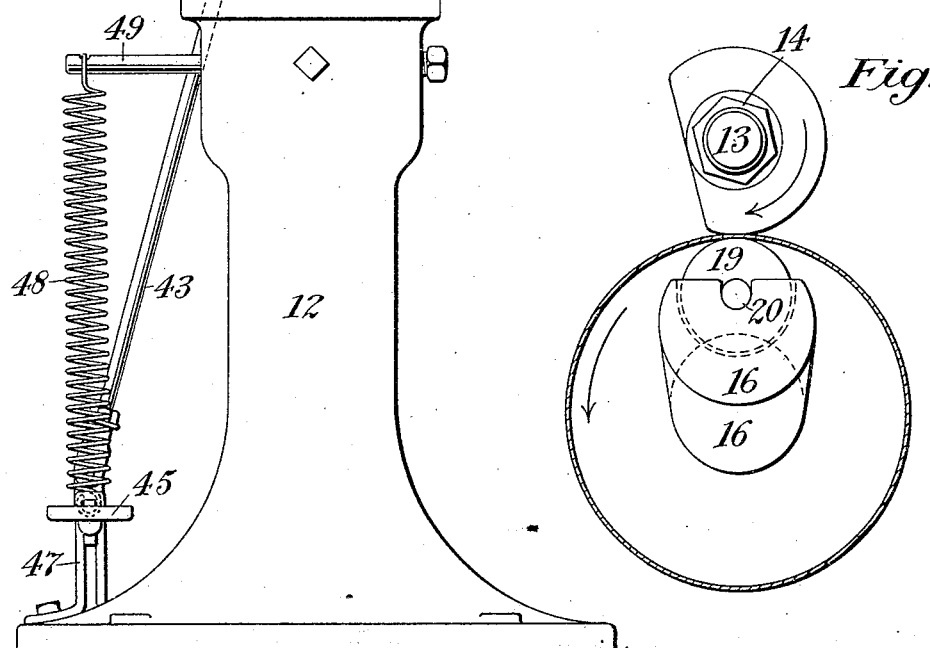
Figure 8:
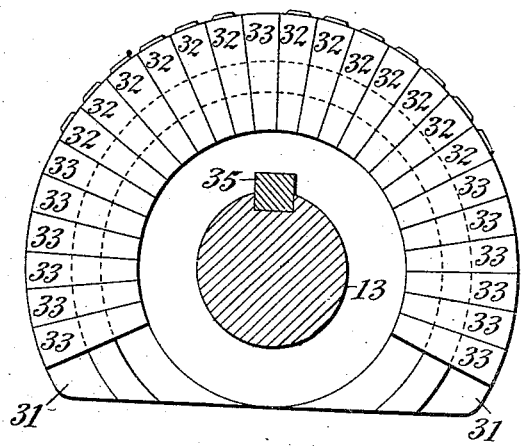
Figure 9:
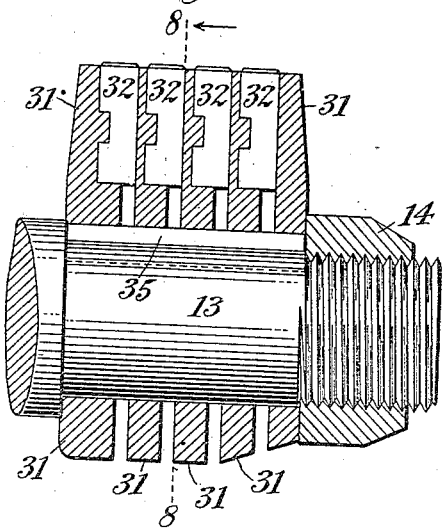
Figure 11:
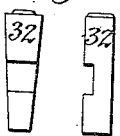
Figure 10:
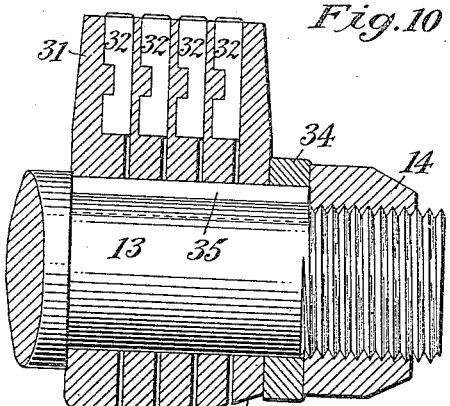
Figure 12:
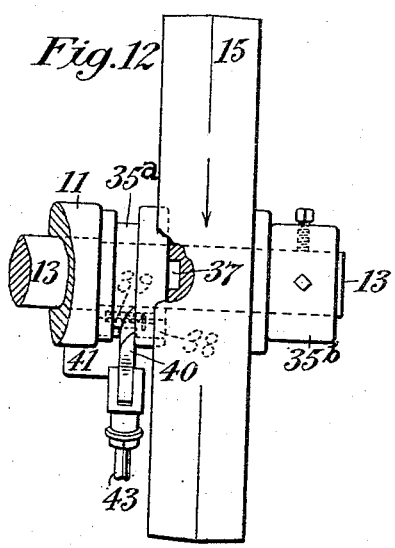
Figure 13:
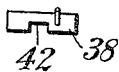

Figure 1 is a plan view of the complete machine adjusted for marking can bodies. Fig. 2 is a view similar to Fig. 1, with the machine adjusted for marking can covers. Fig. 3 is an enlarged side elevation of the machine, with the adjustment shown in Fig. 1, and with a can in position for marking, a portion only of the can being shown, in section. Fig. 4 is an enlarged front elevation, viewed from the right of Fig. 1. Fig. 5 is a détail elevation showing how a can body is operated on. Fig. 6 is an enlarged front elevation, partly in section, of the upper portion of the machine as viewed from the front of Fig. 2, but with a slight change in the operative position of certain parts. Fig. 7 is a sectional detail on line 7 of Fig. 3 looking toward the right and shows the brake on the marking wheel shaft. Fig. 8 is an enlarged cross sectional elevation of the rotary marking wheel or die-head taken on line 8—8 of Fig. 9 looking toward the left. Fig. 9 is an enlarged central vertical section of the marking wheel taken longitudinally of its shaft. Fig. 10 is a view similar to Fig. 9 but shows the use of smaller types in the marking wheel. Fig. 11 is a detail showing a side and end elevation of one of the smaller types or dies shown in Fig. 10. Fig. 12 is a detail view showing the one-revolution clutch which is employed on the marking wheel shaft. Fig. 13 is a detail view of the locking pin employed in the one-revolution clutch.

The illustrated embodiment of my invention comprises a machine head 11 mounted on a base 12 to which it is secured by set-screws as shown, the head having a cylindrical downwardly extending portion or shank which fits in a socket in the base (shown in dotted lines in Fig. 3). The head 11 and base 12 are made in two separate parts merely for convenience of manufacture and in assembling.

The machine head 11 is provided with bearings for a cross-shaft or horizontal shaft 13 which carries at one of its projecting ends a segmental marking wheel or die-head, held in place by a nut 14, and the shaft has mounted thereon at its other end a belt pulley 15 for driving the shaft 13 and operating the marking wheel.

Work holders are provided for positioning and retaining a can-cylinder or can-cover, as the case may be, in proper relation to the marking wheel. The means for holding a can-cylinder in position to be marked comprise a can-supporting horn 16 shown as formed integral with a band 17 encircling the cylindrical shank of the machine head 11. The band 17 is split and is clamped in position by clamp-bolts 18. The horn 16 on its upper side and near its outer extremity carries a hardened steel roll or cylindrical platen 19. The lower part of the roll 19 occupies a recess in the upper side of the horn and the roll is fixed on a short shaft 20 extending parallel with the length of the horn and having bearings in notches therein as shown. When the body or cylinder of a can is to be marked the mouth of the can is slipped over the horn with the portion of the cylinder that is to be marked resting on the roll 19, as illustrated in Figs. 3 and 5.

The means for holding a can cover in position to be marked comprise a table-support 21 shown as formed integral with the split band 17 and in the main extending substantially at right angles to the horn 16. A carriage-supporting table 22 is mounted on the table support 21 and is secured in position by bolts 23 and is adjustable to and from the machine head 11 by reason of the fact that the bolts 23 pass through a slotted hole in the table-support 21 as indicated by dotted lines in Fig. 4. A horizontally traveling carriage 24 is mounted on the table 22 and is supported on anti-friction rollers 25 and is guided by dovetail flanges or ways at opposite edges of the table 22 as shown, one of such flanges being shown as removable and held in place by screws, the other flange being formed integral with the table 22. The carriage has a horizontal rectilinear traveling movement. The direction of traveling movement of the carriage 24 is at right angles to a vertical plane which is radial to the cylindrical shank of the machine head 11. For holding can-covers of different sizes or diameters the carriage 24 is provided with a separable or removable plane-faced platen or anvil which is circular in cross-section and is secured to the carriage by a screw-stud 27. The anvil 26 is provided with a hardened steel cap or facing 28. Anvils of different sizes may be interchanged with each other to accommodate can-covers of correspondingly different sizes. When a can-cover is in position to be marked it fits over the circular cap 28 with its flat central portion resting on the plane face thereof, as shown in Fig. 6.

When the clamp-bolts 18 are loosened either the cylinder-supporting horn 16 or the cover-supporting table 22, as desired, may be swung into operative position beneath the marking wheel and may be fixed in such position by tightening the bolts 18. To regulate the depth of indentation of the imprinted characters both the horn and the table may be adjusted vertically by means of an adjusting screw 29 which screws into the split-band 17 and whose head engages with a flange formed at the top of the base 12. The carriage 24 may be horizontally adjusted to the proper initial or starting position, indicated in Fig. 2, by a screw 30 carried by the table 21.

The means for producing the indented marking on the can-cylinders and can-covers comprise a rotary segmental marking wheel or die-head. The marking wheel comprises segmental disks 31, notched and tapered radial hardened steel types 32, and blank types or spacing blocks 33. The types are maintained in true radial position and in circumferential alinement by arc shaped guide ribs formed on the disks and fitting into corresponding grooves in the types and blanks as shown in the drawings. To enable the types to withstand the heavy pressure during the marking operation, their bases rest against cylindrical shoulders formed on the disks, but these shoulders are not as deep as the width of the types and thus permit the types to be clamped between the disks and also allow the use of different sizes of type. Two sizes of type are shown in the drawings, a larger size in Fig. 9 and a smaller size in Figs. 10 and 11. The clamping nut 14, threaded on the end of the shaft 13, clamps the disks together on the types and against a shoulder formed on the shaft 13. When the smaller sizes of types are employed the extra space may be filled up by a washer or ring 34 (Fig. 10). The disks 31, and consequently the entire marking wheel including the types, are compelled to rotate with the shaft 13 by a key 35 fixed in the shaft 13 and over which the disks are notched and adapted to slide longitudinally of the shaft to clamp the types. The type-holding disks 31 are flattened or cut away at one edge so as to give a segmental or circumferentially mutilated shape to the entire marking wheel. The types together with the spacing blanks occupy about two-thirds of what would be a complete circumferential circle. The arrangement is such that when the marking wheel comes to rest after each marking operation the cut away side or flattened portion of the marking wheel will be lowermost and adjacent or next to the horn or to the table, according to which is in position under the marking wheel. This cut away or flattened configuration of the marking wheel permits a can cylinder to be placed in position for marking on the horn 16 and laso permits the removal of the can from the horn after marking without necessitating any movement or adjustment of the horn or of the marking wheel or of its shaft 13. Likewise a can cover may be placed in position on the anvil when the carriage is in the position indicated by dotted lines in Fig. 2 and then the carriage together with the cover to be marked may be moved under the marking wheel to the initial or starting position, as shown in full lines in Fig. 2, but in Fig. 2 no can cover is shown in position on the anvil whose hardened steel face 28 is seen in Fig. 2.

For each marking operation the marking wheel and its driving shaft 13 are given a single revolution and are brought to rest again in the original position with the flattened portion of the marking wheel downward. The means provided for imparting a single revolution only to the shaft 13 comprise a one-revolution clutch for connecting the belt pulley 15 with the shaft 13, and comprise also a brake for bringing the shaft 13 to rest when the clutch is disconnected. The clutch *per se* and the brake *per se* are both of standard form or construction, such as are commonly used on various kinds of machines, but are here incorporated as elements of the complete machine and are shown and particularly described to effect a complete disclosure of an operative embodiment of the invention.

The one-revolution clutch comprises a peripherally grooved collar 35$^a$ shown as fixed by a key (shown in dotted lines, Fig. 12) on the shaft 13. The driving pulley 15 is loosely mounted on the shaft 13 and is retained in place thereon by a retaining-collar 35$^b$ which is shown as held in place by set screws. The hub of the pulley 15 has a notch 37 in which a locking-pin 38, longitudinally slidable in the driving collar 35$^a$, is adapted to engage. The pin 38 is moved in the direction of its engagement or locking movement by a coiled thrust spring 39 (shown in dotted lines, Fig. 12) which abuts against a shoulder formed in the way in which the pin slides and against a small stud carried by the pin 38. The locking pin 38 is normally held out of engagement with the pulley 15 by a wedge-shaped cam lever 40 shown as pivoted on a bracket 41 extending from the machine head 11. The cam lever 40 occupies a peripheral groove in the collar 35$^a$ and is adapted to engage in a notch 42 in the locking pin 38. The means for actuating the cam lever comprise an operating rod 43 pivoted to the lever 40 and connected by a universal joint 44 with a treadle 45, shown as pivoted on a bracket 46 extending from the base 12 and as guided by a yoke or stirrup 47 mounted on the base. The treadle is raised and the cam lever 40 brought into engagement with the locking pin 38 by a helical tractile spring 48 attached to the treadle and to a support 49 extending out from the upper portion of the base 12. The pulley 15 rotates continuously and when the cam lever 40 is withdrawn from the notch 42 in the locking pin 38, by depressing the treadle, the pin 38 will snap into engagement with the notch 37 in the hub of the pulley as the pulley rotates and the shaft 13 will then be driven by the pulley 15. If after the treadle has been depressed it be quickly released then the sloping end of the cam lever 40 will be brought into the path of the pin 38 before it has made its first revolution and will engage in the notch 42 in the pin and move the pin out of engagement with the notch 37 in the hub of the driving pulley 15, and the shaft 13 will therefore be driven or rotated through one revolution only.

A brake is provided to prevent the momentum of the shaft 13 and the parts driven thereby, including the marking wheel, from carrying it past the point at which the locking pin 38 is disengaged from the pulley 15. The brake comprises a sleeve 50 shown as fixed on the shaft 13 by set screws, and clamping jaws 51 partially encircling the sleeve and guided by the machine head 11. A friction bushing 52, which may be of leather, is interposed between the sleeve 50 and the jaws 51 and the jaws may be drawn together on this bushing by screws 53.

The one-revolution clutch and the brake cause the marking wheel to come to rest each time with its flattened or cut away portion lowermost, thus leaving a free space for the insertion and removal of can cylinders. when they are being operated upon, and also providing a like free space for permitting the insertion or placing of the can covers at the initial or starting position, when they are being operated upon. A can-cylinder may be slipped over the horn 16 with its side resting upon the hardened roll 19, as seen in Fig. 3. Then the treadle 45 is depressed and released and the marking wheel or die-head makes one revolution, and the can cylinder is rolled between the hardened steel types, projecting from the die-head, and the hardened steel roll 19, as shown in Fig. 5, where the beginning of the operation is indicated. The characters are indented into the metal of the can body on the outside of the can, and the strongly resistant backing of the smooth surface of the roll 19 prevents any appreciable roughening or embossing effect on the inside of the can. Milk cans and the like are usually of sufficiently heavy material to admit of clearly marking in this manner. The depth to which the characters are indented can be regulated by adjusting the screw 29. As, owing to the curvature of the marking wheel, substantially only a single axial row of letters or other characters is imprinted at a time, no such enormous pressure and power are required as would be needed if a stamp or press were used to imprint all of the characters of the complete inscription simultaneously, and the machine can be correspondingly smaller and lighter and less expensive.

The operation in the case of can-covers is for the most part the same as above described. When the carriage 24 is in the position indicated by dotted lines in Fig. 2 a can-cover may be placed over the anvil 26 with its inner plane surface resting on the hardened steel facing or cap 28, then the carriage may be moved under the marking wheel to the initial or starting position, the flattened or segmental shape of the marking wheel providing a free passageway thereunder. When the treadle is depressed and released the marking wheel will make one revolution. As the marking wheel revolves its arcuate portion, containing the hardened steel types, will engage with the top of the can-cover. As the marking wheel continues to revolve the carriage 24 will travel on the rollers 25 and the mark will be imprinted into the metal of the can cover on the outside thereof, the hardened steel plate 28 preserving smoothness on the inside surface of the cover. The beginning of the marking operation is indicated in Fig. 6. The starting point or the place on the cover at which the lines begin may be regulated or determined by adjusting the screw 30, depending on the diameter of the cover and the length of the lines to be imprinted. The inscription is centered on the cover in a direction transverse to the lines by adjusting the table 22 relatively to its support 21 by means of the stud bolts 23.

The word "platen" in its broader sense is applicable to both the roll 19 and to the anvil 26, and the word "platen" is used in the claims with this broader meaning.

It is obvious that various modifications may be made in the construction shown and above particularly described within the principle and scope of my invention.

I claim:—

1. A can marking machine comprising marking means, and a plurality of work holders of different forms adapted to be brought into coöperative relation with the marking means interchangeably.

2. A can marking machine comprising marking means, and a plurality of interchangeably swinging work holders of different forms coöperative with the marking means.

3. A can-marking machine comprising marking means, a can-body support, and a can-cover support of different form, said supports being movable alternatively into coöperative relation with the marking means.

4. A can marking machine comprising marking means, a supporting roll for can cylinders, a supporting anvil for can covers, and means for bringing either the roll or the anvil into coöperative relation with the marking means.

5. A can marking machine comprising marking means, a swinging support for can cylinders, a swinging support for can covers, the two supports being formed substantially integral with each other, and means for bringing either support into coöperative relation with the marking means.

6. A can marking machine comprising marking means, a support for can cylinders, a support of different form for can covers, said supports being movable alternatively into coöperative relation with the marking means, and means for adjusting the supports in relation to the marking means.

7. A can marking machine comprising marking means, a supporting roll for can cylinders, a supporting anvil for can covers, means for bringing either the roll or the anvil into coöperative relation with the marking means, and means for adjusting the roll and the anvil in relation to the marking means.

8. A can marking machine comprising a rotating segmental marking wheel, a support for can cylinders, a support of different form for can covers, said supports being movable alternatively into operative position in relation to the marking wheel, and means for adjusting the supports to vary their proximity to the marking wheel when in operative position.

9. A can marking machine comprising a rotating segmental marking wheel, a supporting roll for can cylinders, a supporting anvil for can covers, means for bringing either the roll or the anvil into operative position in relation to the marking wheel, and means for adjusting the roll and the anvil to vary their proximity to the marking wheel when in operative position.

10. A can marking machine comprising a rotating segmental marking wheel, a supporting table for can covers, a freely movable carriage mounted to travel on the table, a plane-faced anvil on the carriage and adapted to coact with the marking wheel, and means for adjusting the distance of the working face of the anvil from the marking wheel along a line perpendicular to such face.

11. A can marking machine comprising a rotating segmental marking wheel, a supporting table for can covers, a plane-faced anvil mounted to move freely on the table and adapted to coact with the marking wheel, and means for adjusting the distance of the working face of the anvil from the marking wheel along a line perpendicular to such face.

12. A can marking machine comprising a rotating segmental marking wheel, a supporting horn for can cylinders, a roll mounted on the horn and adapted to coact with the marking wheel, a supporting table for can covers, a rectilinearly movable carriage mounted on the table, a plane-faced anvil on the carriage and adapted to coact with the marking wheel, and means for bringing either the roll or the anvil into coactive relation with the marking wheel.

13. A can marking machine comprising a rotating segmental marking wheel, a supporting horn for can cylinders, a roll mounted on the horn and adapted to coact with the marking wheel, a supporting table for can covers, a rectilinearly movable carriage mounted on the table, a plane-faced anvil on the carriage and adapted to coact with the marking wheel, means for bringing either the roll or the anvil into coactive relation with the marking wheel, and means for adjusting the coactive proximity of the roll to the marking wheel and of the anvil to the marking wheel.

14. A can marking machine comprising a rotating segmental marking wheel, a supporting table for can covers, a freely movable carriage mounted to travel on the table, and a plane-faced anvil separably attached to the carriage and adapted to coact with the marking wheel.

15. A can marking machine comprising a rotating segmental marking wheel, a horizontal table below the marking wheel, a carriage arranged to reciprocate horizontally on the table, an anvil movable with the carriage and adapted to coact with the marking wheel, and means for adjusting the initial horizontal position of the carriage without affecting the vertical position of the anvil.

16. A can marking machine comprising a rotating segmental marking wheel, an anvil supported below the marking wheel and freely movable horizontally, and means for adjusting the initial horizontal position of the anvil relatively to the marking wheel.

17. A can marking machine comprising a rotating segmental marking wheel, a horizontal table, a carriage movable horizontally on the table, an anvil movable with the carriage and adapted to coact with the marking wheel, and means for adjusting the anvil horizontally and transversely to the direction of movement of the carriage.

18. A can marking machine comprising a rotating segmental marking wheel, a horizontal table, an anvil supported on the table and movable horizontally thereto and adapted to coact with the marking wheel, and means for adjusting the table together with the anvil horizontally and transversely to the direction of movement of the anvil.

19. A can marking machine comprising a rotating marking wheel, a horizontal table, an anvil supported on the table and movable horizontally thereto and adapted to coact with the marking wheel, and means for adjusting the position of the anvil in three directions in reference to the marking wheel.

20. A can marking machine comprising a machine head provided with a vertical cylindrical shank, a horizontal shaft having bearings in the machine head, a circumferentially mutilated marking wheel fixed on the shaft, a continuously rotating driving wheel, a one-revolution clutch for connecting the driving wheel with the shaft, a band encircling the shank, means for fixing the band in position on the shank, a screw for adjusting the band vertically on the shank, a horn formed substantially integral with the band and extending horizontally therefrom, a table-support formed substantially integral with the band and extending horizontally therefrom at a point horizontally removed from the horn, the horn and the table-support being adapted to swing into operative position under the marking wheel interchangeably, a cylindrical roll carried by the horn and adapted to coact with the marking wheel for marking can cylinders, and a rectilinearly movable anvil carried by the table and adapted to coact with the marking wheel for marking can covers.

21. A can-marking machine comprising a marking wheel, a table adjustable toward and from the marking wheel, and an anvil mounted on the table and adjustable thereon transversely with respect to the marking wheel.

22. A can-marking machine comprising a marking wheel, an anvil movable in unison with the marking wheel during the marking operation, and means for supporting the anvil having provision for adjusting its position transversely with respect to the marking wheel.

23. A can-marking machine comprising a marking wheel, a work support, and means upon which the work support is mounted, the work support being mounted to move in unison with the marking wheel during the marking operation, and said means having provision for movement to carry the work support into and out of operative relation with the marking wheel.

24. A can-marking machine comprising a marking wheel, a table, and a work support movable upon the table in a direction to permit the advance of the work during the operation of the marking wheel, the table being mounted movably to permit it to be moved to carry the work support into and out of operative relation with the marking wheel.

In testimony whereof I affix my signature in presence of two witnesses.

JACOB B. CONOVER.

Witnesses:
   HENRY D. WILLIAMS,
   BERNARD COWEN.